US012634786B2

(12) United States Patent
Pancorbo Marcos et al.

(10) Patent No.: US 12,634,786 B2
(45) Date of Patent: May 19, 2026

(54) POLICY BASED SELECTION OF NETWORK

(71) Applicant: Telefonaktiebolaget LM Ericsson (publ), Stockholm (SE)

(72) Inventors: Maria Belen Pancorbo Marcos, Madrid (ES); Peter Hedman, Helsingborg (SE); Daniel Nilsson, Älvängen (SE); Jinyao Cao, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 789 days.

(21) Appl. No.: 17/925,420

(22) PCT Filed: May 21, 2021

(86) PCT No.: PCT/IB2021/054448

§ 371 (c)(1),
(2) Date: Nov. 15, 2022

(87) PCT Pub. No.: WO2021/324667

PCT Pub. Date: Nov. 25, 2021

(65) Prior Publication Data

US 2023/0189105 A1    Jun. 15, 2023

Related U.S. Application Data

(60) Provisional application No. 63/029,143, filed on May 22, 2020.

(51) Int. Cl.
 *H04W 36/14* (2009.01)
 *H04W 8/20* (2009.01)
 (Continued)

(52) U.S. Cl.
 CPC ........... *H04W 36/14* (2013.01); *H04W 8/205* (2013.01); *H04W 36/0016* (2013.01); *H04W 36/30* (2013.01)

(58) Field of Classification Search
 CPC . H04W 36/14; H04W 8/205; H04W 36/0016; H04W 36/30; H04W 40/02;
 (Continued)

(56) References Cited

U.S. PATENT DOCUMENTS 12,231,992 B2 * 2/2025 Xiong ................... H04W 72/30
12,262,253 B2 * 3/2025 Kim ................ H04W 36/00698
(Continued)

FOREIGN PATENT DOCUMENTS

WO      2019/032972 A1      2/2019

OTHER PUBLICATIONS

International Search Report and Written Opinion dated Aug. 24, 2021 issued in PCT Application No. PCT/IB2021/054448 filed May 21, 2021, consisting of 18 pages.
(Continued)

*Primary Examiner* — Abdullahi Ahmed
(74) *Attorney, Agent, or Firm* — Sonoda & Kobayashi Intellectual Property Law; Sarvajit S. Patil

(57) ABSTRACT

Apparatuses and methods for policy based selection of a network. In one embodiment, a method implemented in a user equipment (UE) includes obtaining a transfer policy from a policy node of a first network, the transfer policy being associated with a network selection for an application; and determining whether the application is to be transferred from using the first network to using a second network based at least in part on the obtained transfer policy, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network.

20 Claims, 7 Drawing Sheets

(51) Int. Cl.
   *H04W 36/00* (2009.01)
   *H04W 36/30* (2009.01)

(58) Field of Classification Search
   CPC ....... H04W 4/24; H04W 48/16; H04W 48/18;
   H04L 45/306; H04L 12/1407; H04M
   15/49; H04M 15/66; H04M 15/80; H04M
   15/8016; H04M 15/8055; H04M 15/8061;
   H04M 15/8033; H04M 15/8038; H04M
   15/8044
   See application file for complete search history.

(56) References Cited

U.S. PATENT DOCUMENTS

| | | | | |
|---|---|---|---|---|
| 2020/0351409 | A1 * | 11/2020 | Karampatsis | H04W 76/30 |
| 2022/0053444 | A1 * | 2/2022 | Yu | H04W 60/00 |
| 2022/0060883 | A1 * | 2/2022 | Zhu | H04W 8/245 |
| 2023/0189191 | A1 * | 6/2023 | Wang | H04W 36/00226 370/329 |

OTHER PUBLICATIONS

3GPP TR 22.827 V17.1.0 (Dec. 2019); 3rd Generation Partnership Project; Technical Specification Group Services and System Aspects; Study on Audio-Visual Service Production; Stage 1 (Release 17), consisting of 78 pages.
3GPP TR 23.700-07 V0.3.0 (Jan. 2020); 3rd Generation Partnership Project; Technical Specification Group Services and System Aspects; Study on Enhanced Support of Non-public Networks (Release 17), consisting of 42 pages.
3GPP TS 23.501 V16.4.0 (Mar. 2020); 3rd Generation Partnership Project; Technical Specification Group Services and System Aspects; System Architecture for the 5G System (5GS); Stage 2 (Release 16), consisting of 430 pages.
3GPP TS 23.502 V16.4.0 (Mar. 2020); 3rd Generation Partnership Project; Technical Specification Group Services and System Aspects; Procedures for the 5G System (5GS); Stage 2 (Release 16), consisting of 582 pages.
3GPP TS 23.503 V16.4.0 (Mar. 2020); 3rd Generation Partnership Project; Technical Specification Group Services and System Aspects; Policy and Charging Control Framework for the 5G System (5GS); Stage 2 (Release 16), cosisting of 115 pages.
3GPP TS 23.503 V16.4.1 (Apr. 2020); 3rd Generation Partnership Project; Technical Specification Group Services and System Aspects; Policy and charging control framework for the 5G System (5GS); Stage 2 (Release 16), consisting of 115 pages.
3GPP TS 24.502 V16.3.0 (Mar. 2020); 3rd Generation Partnership Project; Technical Specification Group Core Network and Terminals; Access to the 3GPP 5G Core Network (5GCN) via Non-3GPP Access Networks (N3AN); Stage 3 (Release 16), consisting of 84 pages.

* cited by examiner

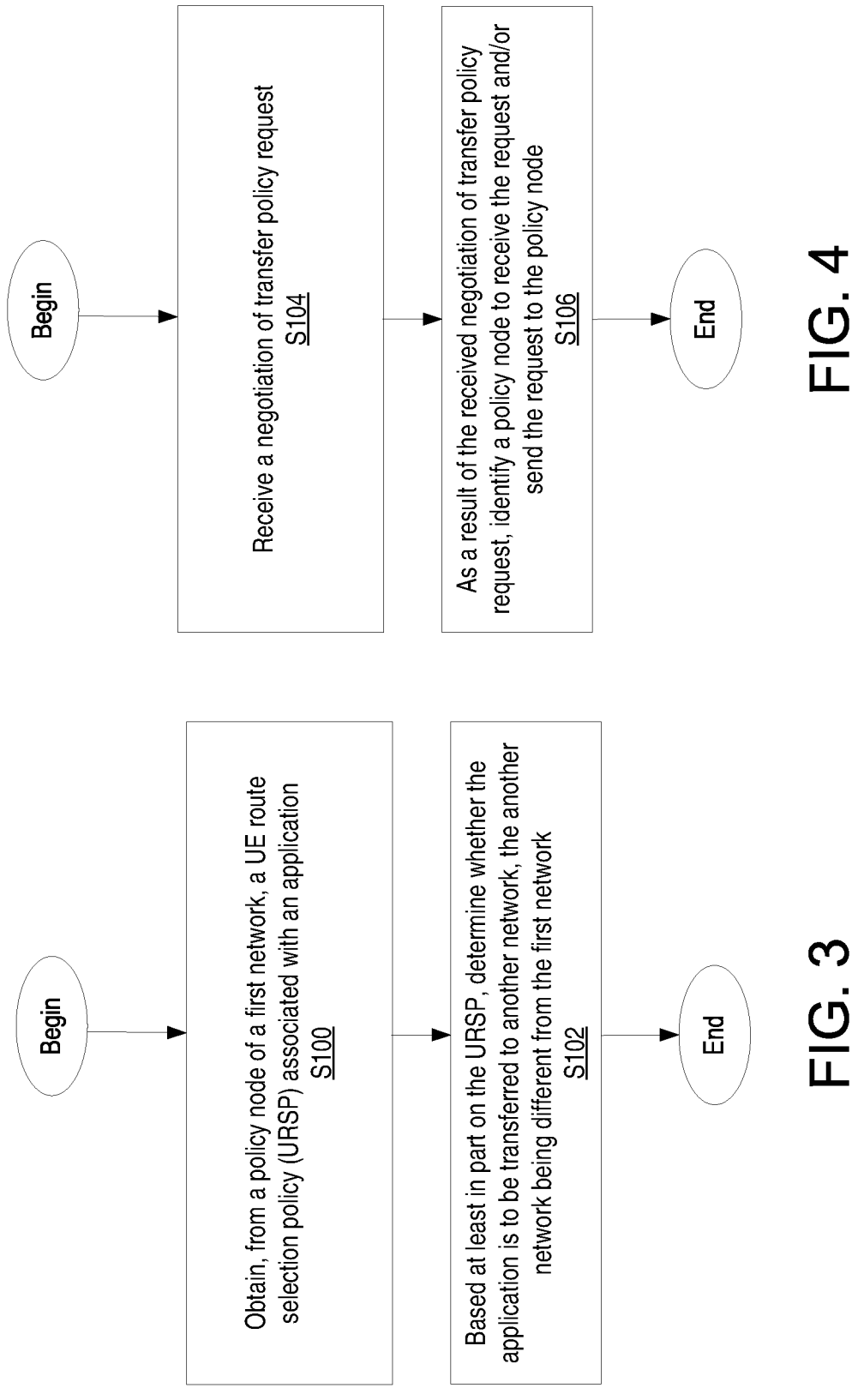

Begin

Receive a negotiation of transfer policy request
S104

As a result of the received negotiation of transfer policy request, identify a policy node to receive the request and/or send the request to the policy node
S106

End

FIG. 4

Begin

Obtain, from a policy node of a first network, a UE route selection policy (URSP) associated with an application
S100

Based at least in part on the URSP, determine whether the application is to be transferred to another network, the another network being different from the first network
S102

End

FIG. 3

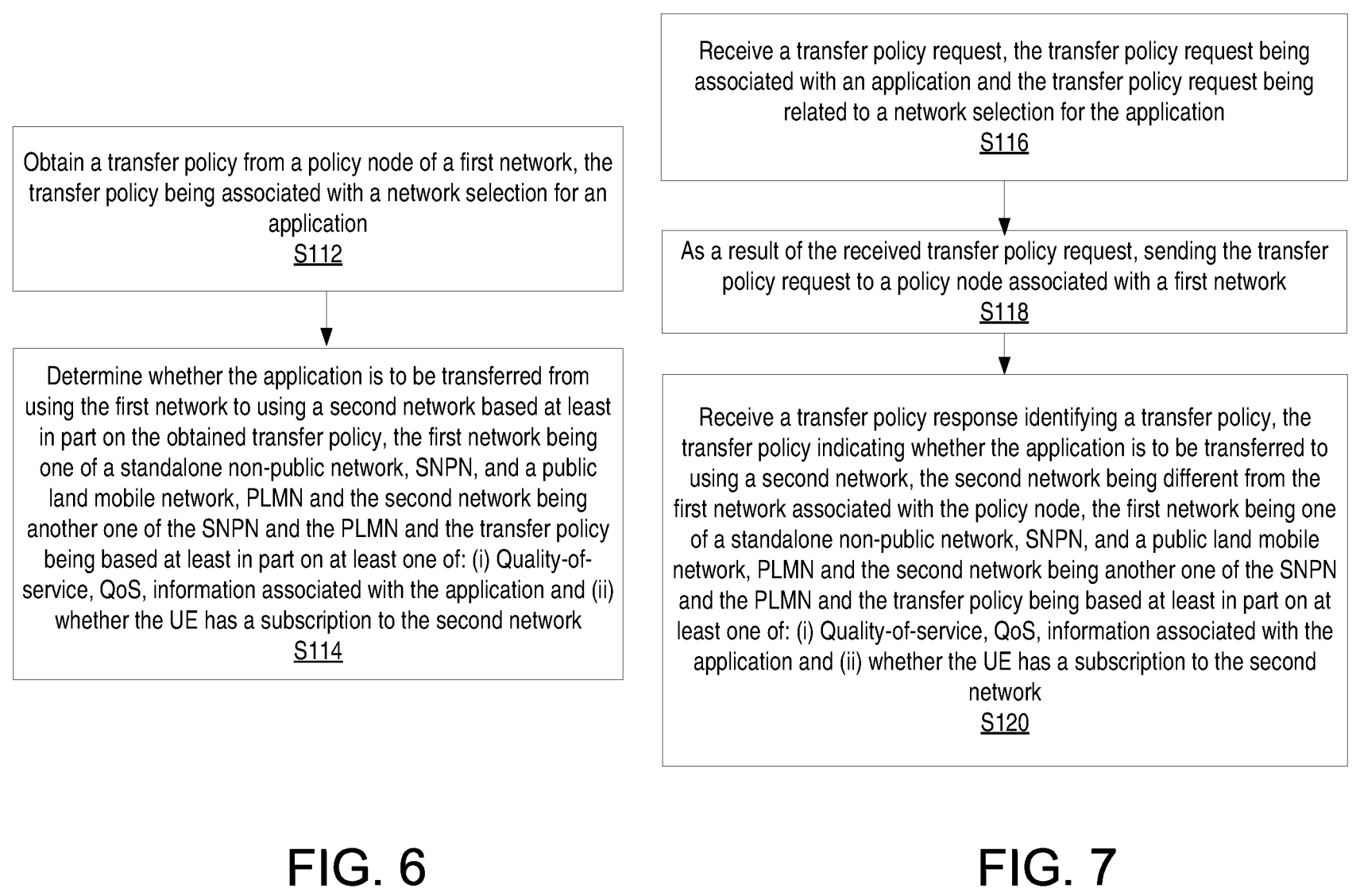

Receive a transfer policy request, the transfer policy request being associated with an application and the transfer policy request being related to a network selection for the application
S116

As a result of the received transfer policy request, sending the transfer policy request to a policy node associated with a first network
S118

Receive a transfer policy response identifying a transfer policy, the transfer policy indicating whether the application is to be transferred to using a second network, the second network being different from the first network associated with the policy node, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network
S120

FIG. 7

Obtain a transfer policy from a policy node of a first network, the transfer policy being associated with a network selection for an application
S112

Determine whether the application is to be transferred from using the first network to using a second network based at least in part on the obtained transfer policy, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network
S114

FIG. 6

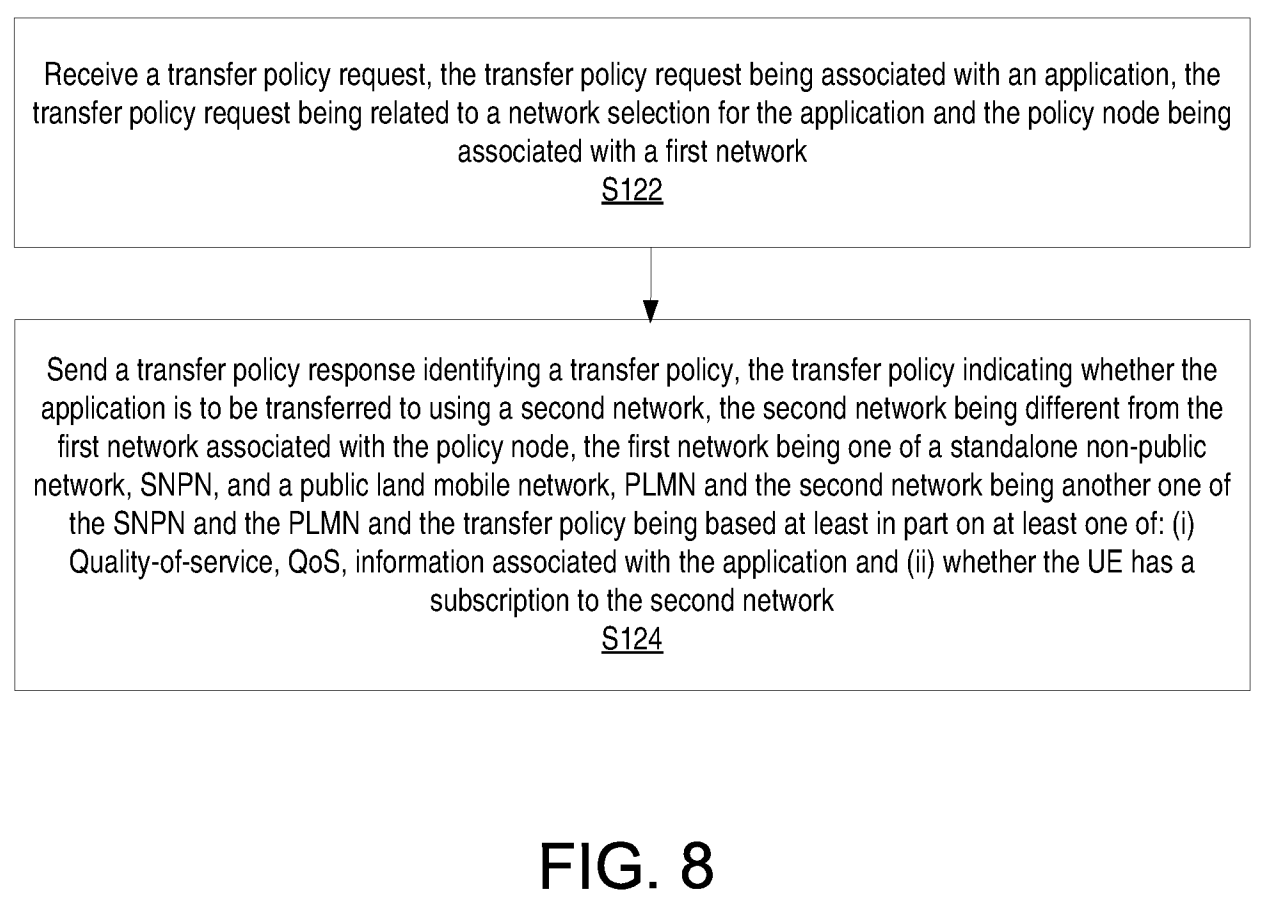

Receive a transfer policy request, the transfer policy request being associated with an application, the transfer policy request being related to a network selection for the application and the policy node being associated with a first network
S122

Send a transfer policy response identifying a transfer policy, the transfer policy indicating whether the application is to be transferred to using a second network, the second network being different from the first network associated with the policy node, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network
S124

FIG. 8

POLICY BASED SELECTION OF NETWORK

CROSS-REFERENCE TO RELATED APPLICATIONS

This application is a Submission Under 35 U.S.C. § 371 for U.S. National Stage Patent Application of International Application No.: PCT/IB2021/054448, filed May 21, 2021 entitled "POLICY BASED SELECTION OF NETWORK," which claims priority to U.S. Provisional Application No.: 63/029,143, filed May 22, 2020, entitled "POLICY BASED SELECTION OF NETWORK," the entireties of both of which are incorporated herein by reference.

TECHNICAL FIELD

The present disclosure relates to wireless communication and, in particular, to arrangements for policy based selection of a network.

INTRODUCTION

The Third Generation Partnership Project (3GPP) is currently working on a Feature Study for enhancing some aspects of Non-Public Networks (NPN), 3GPP Technical Report (TR) 23.700-07. Selected solutions of the TR may reach normative specifications 3GPP Technical Specification (TS) 23.501, TS 23.502 and TS 23.503.

One issue is, e.g., related to a music festival use case described in 3GPP TR 22.827 in short shown by FIG. 1 (reproduction of FIG. 5.3.3-1 from 3GPP TR 22.827). In the example music festival use case shown in FIG. 1, users are carrying their own 5G enabled smartphones and want to enhance their experience at the music festival, e.g., enhance the audio quality, follow a specific band member video/audio, listen to another stage, etc. The music festival is arranged by a company that has setup their own audio distribution non-public network (NPN) and is also using the radio spectrum assigned for private use which may vary in each region. How to enable users/subscribers to be able to fully utilize services in such use cases has not been determined.

SUMMARY

Some embodiments advantageously provide methods and apparatuses related to arrangements for policy based selection of a network.

In one embodiment, a method implemented in a user equipment (UE) includes obtaining, from a policy node of a first network, a UE route selection policy (URSP) associated with an application; and based at least in part on the URSP, determining whether the application is to be transferred to another network, the other network being different from the first network.

In one embodiment, a method implemented in a network exposure (NE) node includes receiving a negotiation of transfer policy request; and as a result of the received negotiation of transfer policy request, identifying a policy node to receive the request and/or send the request to the policy node.

In one embodiment, a method implemented in a policy node includes receiving a negotiation of transfer policy request; and performing at least one operational task based at least in part on the request.

According to an aspect of the present disclosure, a method implemented in a user equipment, UE, is provided. The method includes obtaining a transfer policy from a policy node of a first network, the transfer policy being associated with a network selection for an application; and determining whether the application is to be transferred from using the first network to using a second network based at least in part on the obtained transfer policy, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network.

In some embodiments, the QoS information comprises at least one of: at least one Quality-of-service, QoS, requirement for the application; a Quality-of-service, QoS, sustainability prediction for a plurality of user equipments, UEs, that are expected to use the application; and a Quality-of-service, QoS, degradation prediction for at least one UE out of a plurality of user equipments, UEs, that are expected to use the application. In some embodiments, the method further includes sending traffic associated with the application over one of the first network and the second network based at least in part on the determination. In some embodiments, the UE is registered to the first network and the method further comprises: as a result of a determination to transfer the application to the second network, registering to the second network and establishing a protocol data unit, PDU, session in the second network; and sending traffic associated with the application over the second network via the established PDU session.

In some embodiments, the UE is registered to the first network and the method further comprises: as a result of a determination to not transfer the application to the second network, sending traffic associated with the application over the first network that the UE is registered to. In some embodiments, the UE has a first subscription to the first network and a second subscription to the second network. In some embodiments, at least one of: the transfer policy indicates a date and/or a time during which the transfer policy is valid; the transfer policy indicates a location at which the transfer policy is valid; and the location, the date and/or the time indicated in the transfer policy corresponding to an expected use of the application at a pre-determined event associated with the SNPN. In some embodiments, the method further includes when the transfer policy becomes invalid according to the location, the date and/or the time indicated in the transfer policy, discarding the transfer policy.

In some embodiments, the transfer policy indicates a network identifier, the network identifier identifying one of the first network and the second network to which the application is to be transferred to. In some embodiments, the transfer policy indicates an application identifier, the application identifier identifying the application that is to be transferred according to the transfer policy. In some embodiments, the transfer policy indicates a preferred access type, the preferred access type comprising a network identifier identifying one of the first network and the second network to which the application is to be transferred to.

In some embodiments, the transfer policy indicates a route selection descriptor, RSD, the RSD indicating the preferred access type and the network identifier. In some embodiments, the transfer policy includes information indicating a traffic associated with the application. In some embodiments, the information is comprised in a traffic descriptor, the traffic descriptor identifying the application that is to be transferred according to the transfer policy. In some embodiments, the traffic descriptor further comprises a rule correlation identifier, ID; the method further comprising determining whether the rule correlation ID is a same for both the first network and the second network; and sending traffic to one of the first network and the second network based at least in part on whether the rule correlation ID is the same. In some embodiments, the application is identified in the transfer policy as a Video, Imaging and Audio for Professional Application, VIAPA, application. In some embodiments, the transfer policy is a UE route selection policy, URSP, and the policy node comprises a policy control function, PCF.

According to an aspect of the present disclosure, a method implemented in a network exposure, NE, node, the method comprising: receiving a transfer policy request, the transfer policy request being associated with an application and the transfer policy request being related to a network selection for the application; as a result of the received transfer policy request, sending the transfer policy request to a policy node associated with a first network; and receiving a transfer policy response identifying a transfer policy, the transfer policy indicating whether the application is to be transferred to using a second network, the second network being different from the first network associated with the policy node, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network.

In some embodiments, the QoS information comprises at least one of: at least one Quality-of-service, QoS, requirement for the application; a Quality-of-service, QoS, sustainability prediction for a plurality of user equipments, UEs, that are expected to use the application; and a Quality-of-service, QoS, degradation prediction for at least one UE out of a plurality of user equipments, UEs, that are expected to use the application. In some embodiments, the transfer policy request indicates at least one of a plurality of user equipments, UEs, that are expected to use the application, a time and/or a date that the plurality of UEs are expected to use the application and at least one Quality-of-service, QoS, requirement for the application. In some embodiments, the transfer policy request is received from an application function, AF, node associated with the application.

In some embodiments, the AF node is associated with an application service provider, ASP, portal for a Video, Imaging and Audio for Professional Application, VIAPA, application service. In some embodiments, the method further includes sending the transfer policy response identifying the transfer policy to an application function, AF, node associated with the application. In some embodiments, the transfer policy response comprises a transfer policy identifier, ID, identifying the transfer policy. In some embodiments, at least one of: the transfer policy indicates a date and/or a time during which the transfer policy is valid; the transfer policy indicates a location at which the transfer policy is valid; and the location, the date and/or the time indicated in the transfer policy corresponding to an expected use of the application at a pre-determined event associated with the SNPN. In some embodiments, the transfer policy becomes invalid according to the location, the date and/or the time indicated in the transfer policy. In some embodiments, the transfer policy indicates a network identifier, the network identifier identifying one of the first network and the second network to which the application is to be transferred to. In some embodiments, the transfer policy indicates an application identifier, the application identifier identifying the application that is to be transferred according to the transfer policy.

In some embodiments, the transfer policy indicates a preferred access type, the preferred access type comprising a network identifier identifying one of the first network and the second network to which the application is to be transferred to. In some embodiments, the transfer policy indicates a route selection descriptor, RSD, the RSD indicating the preferred access type and the network identifier. In some embodiments, the transfer policy includes information indicating a traffic associated with the application. In some embodiments, the information is comprised in a traffic descriptor, the traffic descriptor identifying the application that is to be transferred according to the transfer policy. In some embodiments, the traffic descriptor further comprises a rule correlation identifier, ID. In some embodiments, the transfer policy is a UE route selection policy, URSP, and the policy node comprises a policy control function, PCF.

According to another aspect, a method implemented in a policy node is provided. The method comprises receiving a transfer policy request, the transfer policy request being associated with an application, the transfer policy request being related to a network selection for the application and the policy node being associated with a first network; and sending a transfer policy response identifying a transfer policy, the transfer policy indicating whether the application is to be transferred to using a second network, the second network being different from the first network associated with the policy node, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE has a subscription to the second network.

In some embodiments, the method further includes determining the transfer policy, the transfer policy being based at least in part on at least one of: at least one Quality-of-service, QoS, requirement for the application; a Quality-of-service, QoS, sustainability for a plurality of user equipments, UEs, that are expected to use the application; and a Quality-of-service, QoS, degradation for at least one UE out of the plurality of UEs that are expected to use the application. In some embodiments, the method further includes sending the transfer policy to a user equipment, UE. In some embodiments, the transfer policy request indicates at least one of a plurality of user equipments, UEs, that are expected to use the application, a time and/or a date that the plurality of UEs are expected to use the application and at least one Quality-of-service, QoS, requirement for the application. In some embodiments, the transfer policy request is received from a network exposure, NE, node.

In some embodiments, the application is a Video, Imaging and Audio for Professional Application, VIAPA, application. In some embodiments, the transfer policy response comprises a transfer policy identifier, ID, identifying the transfer policy. In some embodiments, at least one of: the transfer policy indicates a date and/or a time during which the transfer policy is valid; the transfer policy indicates a location at which the transfer policy is valid; and the location, the date and/or the time indicated in the transfer policy corresponding to an expected use of the application at a pre-determined event associated with the SNPN. In some embodiments, the transfer policy becomes invalid according to the location, the date and/or the time indicated in the transfer policy. In some embodiments, the transfer policy indicates a network identifier, the network identifier identifying one of the first network and the second network to which the application is to be transferred to. In some embodiments, the transfer policy indicates an application identifier, the application identifier identifying the application that is to be transferred according to the transfer policy. In some embodiments, the transfer policy indicates a preferred access type, the preferred access type comprising a network identifier identifying one of the first network and the second network to which the application is to be transferred to.

In some embodiments, the transfer policy indicates a route selection descriptor, RSD, the RSD indicating the preferred access type and the network identifier. In some embodiments, the transfer policy includes information indicating a traffic associated with the application. In some embodiments, the information is comprised in a traffic descriptor, the traffic descriptor identifying the application that is to be transferred according to the transfer policy. In some embodiments, the traffic descriptor further comprises a rule correlation identifier, ID. In some embodiments, the transfer policy is a UE route selection policy, URSP, and the policy node comprises a policy control function, PCF.

According to another aspect, an apparatus comprising processing circuitry is provided. The processing circuitry is configured to cause the apparatus to perform any one or more of the methods above.

According to another aspect, a computer readable storage medium comprising computer instructions is provided. The computer instructions are executable by at least one processor to perform any one or more of the methods above.

According to another aspect, a system is provided. The system comprises a user equipment, UE, configured to perform any one or more of the methods above; a network exposure, NE, node configured to perform any one or more of the methods above; and a policy node configured to perform any one or more of the methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart of an example process in a user equipment (UE) according to some embodiments of the present disclosure;

FIG. 4 is a flowchart of an example process in a network exposure node (NE) according to some embodiments of the present disclosure;

FIG. 6 is a flowchart of an example process in a user equipment (UE) according to some embodiments of the present disclosure;

FIG. 7 is a flowchart of an example process in a network exposure node (NE) according to some embodiments of the present disclosure;

FIG. 8 is a flowchart of an example process in a policy node according to some embodiments of the present disclosure.

DETAILED DESCRIPTION

Figure 1:
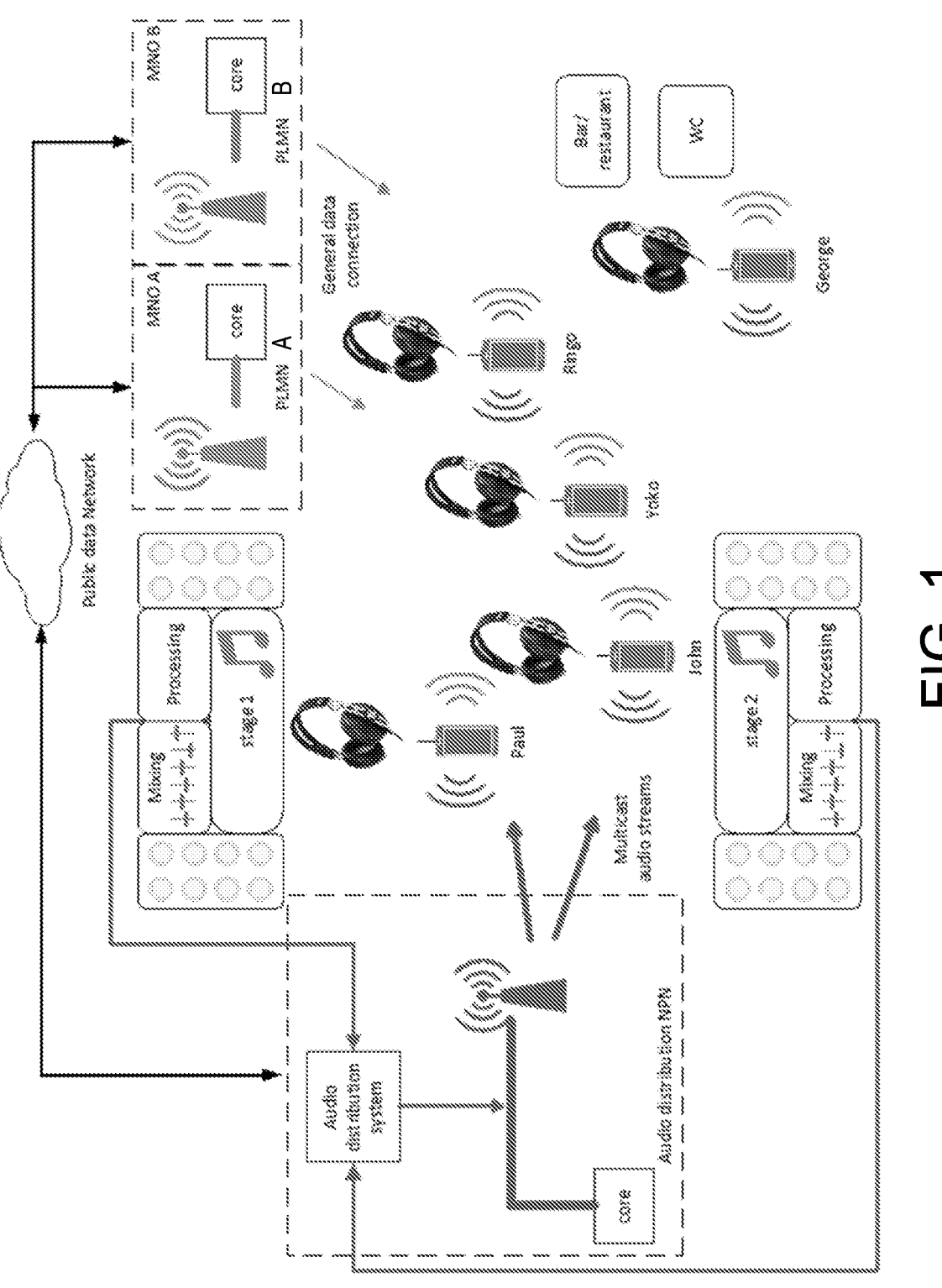
FIG. 1 illustrates an example conceptual arrangement related to NPNs in the context of an example music festival use case.

As described above, enabling users/subscribers to be able to fully utilize services in certain use cases, such as those shown in FIG. 1, is an open issue. In particular, the radio spectrum capacity of the NPN may be limited, and there may be no way to control the network used by each UE that is carried by the music festival audience such that the UE uses the most appropriate and/or efficient network, thereby enabling as many of the festival audience members as possible to receive the best possible performance experience. In FIG. 1, the audio distribution NPN may be a standalone non-public network (SNPN), while some UEs at the music festival may also be subscribed to public land mobile networks (PLMNs) A and/or B. Also, the subscriptions that the audience members have with their own PLMN mobile network operators (MNOs) A and B may vary, and watching high quality video and listening to high quality audio may imply an additional cost for the user/UE.

Even if there would not be a higher cost for the additional high quality media for the UEs of the various PLMN subscriptions, there may be no way that the quality experience can be guaranteed for each user/UE.

Some embodiments of the present disclosure may provide one or more of the following:

provide policies, e.g., URSP rules to the UE on which network the UE is to use for the user data related to a media or application, and/or provide that the network that the UE is to use (e.g., according to the policy) can be another network different than the network providing the rules/policies;

the policies e.g., URSP rules provided to the UE may include information such that the UE can check/determine that the second network accepted the rule/policy provided by the first network;

the standalone non-public network (SNPN) informs the application service provider (ASP) using analytics on the likelihood of a change of Quality-of-service (QoS) for an Analytics target period in the future and in a certain area for a set of UEs that registered to a music festival; and/or the SNPN checks with the PLMN on the likelihood of a change of QoS for an Analytics target period in the future and in a certain area for a set of UEs that have a subscription in that PLMN.

Some embodiments may provide one or more of the following advantages:

enables the possibility to control the network and access used by the UE, for a certain media or application, across two networks, in a secure and trustworthy/legitimate way; and/or enables the control between two networks independently of which of the two networks the UE accesses first.

Before describing in detail example embodiments, it is noted that the embodiments reside primarily in combinations of apparatus components and processing steps related to arrangements for policy based selection of a network.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an NPN UE. The UE herein can by any type of communication device capable of communicating with another UE, an application server, a network node, a server, a network function (NF) or other network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "node" is used herein and can be any kind of network node, such as, a unified data repository (UDR), a policy control function (PCF), a network exposure function (NEF), an application function (AF), etc. In some embodiments, the "node" can be any core network node or other type of network node supporting one or more of the arrangements disclosed herein.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

In some embodiments, the term "providing" may mean sending and/or obtaining and/or generating.

In some embodiments, the term "obtain" or "obtaining" is used herein and may indicate obtaining in, e.g., memory such as in the case where the information is predefined. The term "obtain" or "obtaining" as used herein may also indicate obtaining by receiving signaling indicating the information obtained.

Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) (also known as New Radio (NR)), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE or any node may be distributed over a plurality of UEs or a plurality of nodes. In other words, it is contemplated that the functions of the UE or a node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
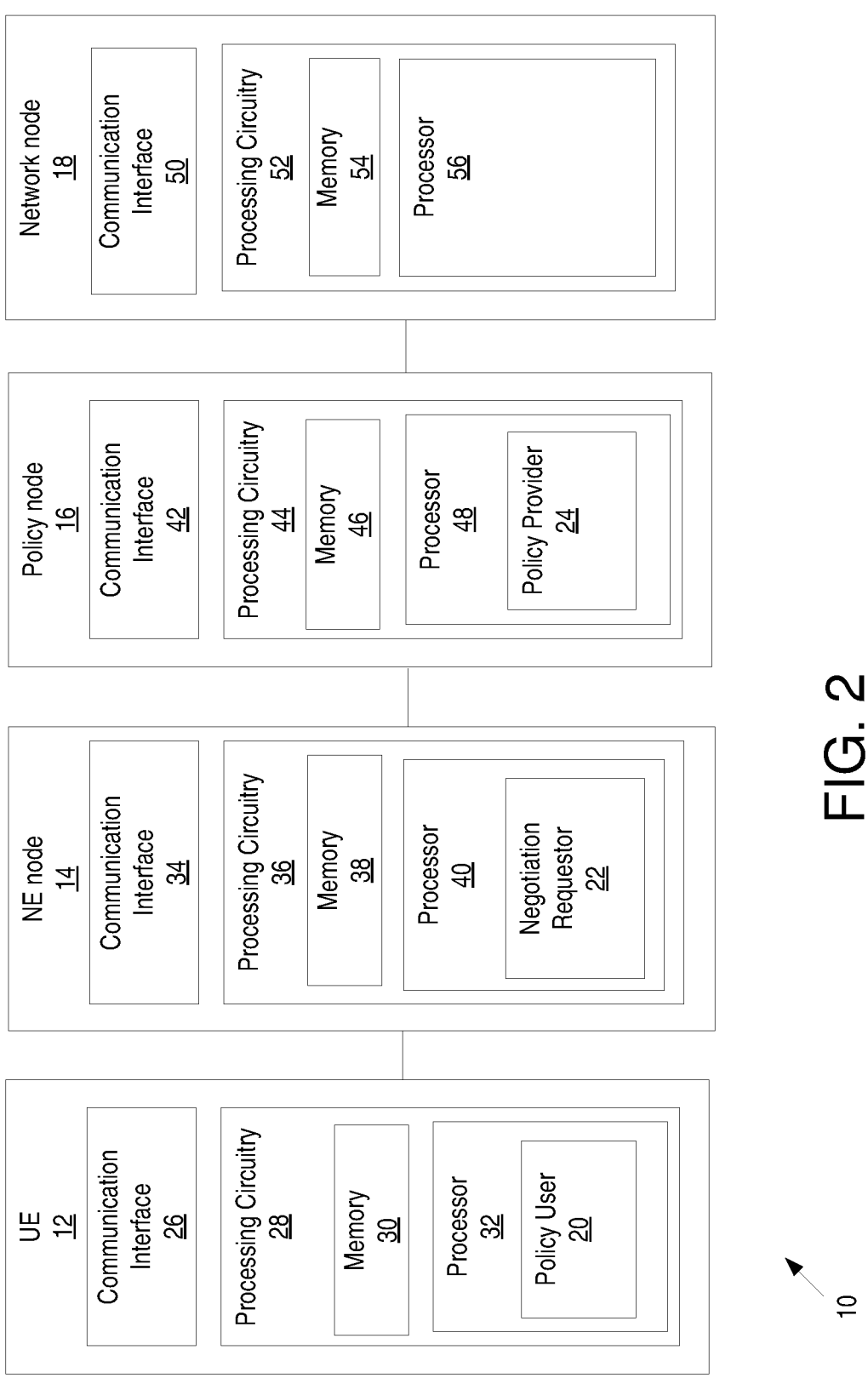
FIG. 2 illustrates an example system architecture and example hardware arrangements for devices in the system, according to some embodiments of the present disclosure.

Referring again to the drawing figures, in which like elements are referred to by like reference numerals, there is shown in FIG. 2 a schematic diagram of a communication system 10, according to another embodiment, constructed in accordance with the principles of the present disclosure. The communication system 10 in FIG. 2 is a non-limiting example and other embodiments of the present disclosure may be implemented by one or more other systems and/or networks. Referring to FIG. 2, the system 10 includes a UE 12, a network exposure (NE) node 14, a policy node 16 and a network node 18.

In some embodiments, the NE node 14 may be, e.g., an application programming interface (API) gateway to a mobile network that may allow third-party applications to get information such as, for example, network events, statistics for analytics, provisioning capabilities, policies and charging services exposed by the mobile network. The policy node 16 may be, for example, a PCF node a. The network node 18 can be any network node, such as, e.g., an AF node in some embodiments, or a data repository (DR) node, such as a UDR in some embodiments.

It should be noted that, for simplicity, a single node is shown for the various entities in the system 10 depicted in FIG. 2 (e.g., a single NE node 14, a single policy node 16, a single UE 12, a single network node 18); however, it should be understood that the system 10 may include numerous entities/nodes of those shown in FIG. 2, as well as, additional entities/nodes not shown in FIG. 2. In addition, the system 10 may include many more connections and/or interfaces than those shown in FIG. 2.

Example implementations, in accordance with an embodiment, of the UE 12, the NE node 14, the policy node 16 and a network node 18 discussed herein will now be described with reference to FIG. 2. The UE 12, the NE node 14 and the policy node 16 may further include a policy user 20, a negotiation requestor 22 and a policy provider 24, respectively. Although elements 12-18 in FIG. 2 are shown connected in a serial manner, such depiction is merely for ease of depiction and understanding. It is understood that the UE 12 may be in wireless communication with nodes 14, 16 and/or 18, and that nodes 14-18 may be connected to and communicate with one another via a cloud network. In FIG. 2, the connections between the devices UE 12, NE node 14, policy node 16 and network node 18 are shown without explicit reference to any intermediary devices or connections. However, it should be understood that intermediary devices and/or connections may exist between these devices, although not explicitly shown.

The UE 12 includes a communication interface 26, processing circuitry 28, and memory 30. The communication interface 26 may be configured to communicate with one or more of other elements in the system 10 to facilitate support for NPNs according to one or more of the techniques in the present disclosure. In some embodiments, the communication interface 26 may be formed as or may include, for example, one or more radio frequency (RF) transmitters, one or more RF receivers, and/or one or more RF transceivers, and/or may be considered a radio interface. In some embodiments, the communication interface 26 may also include a wired interface.

The processing circuitry 28 may include one or more processors 56 and memory, such as, the memory 30. In particular, in addition to a traditional processor and memory, the processing circuitry 28 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 30, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 12 may further include software stored internally in, for example, memory 30, or stored in external memory (e.g., database) accessible by the UE 12 via an external connection. The software may be executable by the processing circuitry 28. The processing circuitry 28 may be configured to control any of the methods and/or processes described herein and/or to cause such methods, and/or processes to be performed, e.g., by the UE 12. The memory 30 is configured to store data, programmatic software code and/or other information described herein. In some embodiments, the software may include instructions stored in memory 30 that, when executed by the processor 56 and/or policy user 20, causes the processing circuitry 28 and/or configures the UE 12 to perform the processes described herein with respect to the UE 12 (e.g., processes described with reference to FIG. 3 and/or any of the other figures).

The NE node 14 includes a communication interface 34, processing circuitry 36, and memory 38. The communication interface 34 may be configured to communicate with one or more of other elements in the system 10 to facilitate support for NPNs according to one or more of the techniques in the present disclosure. In some embodiments, the communication interface 34 may be formed as or may include, for example, one or more radio frequency (RF) transmitters, one or more RF receivers, and/or one or more RF transceivers, and/or may be considered a radio interface. In some embodiments, the communication interface 34 may also include a wired interface.

The processing circuitry 36 may include one or more processors 56 and memory, such as, the memory 38. In particular, in addition to a traditional processor and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the NE node 14 may further include software stored internally in, for example, memory 38, or stored in external memory (e.g., database) accessible by the NE node 14 via an external connection. The software may be executable by the processing circuitry 36. The processing circuitry 36 may be configured to control any of the methods and/or processes described herein and/or to cause such methods, and/or processes to be performed, e.g., by the NE node 14. The memory 38 is configured to store data, programmatic software code and/or other information described herein. In some embodiments, the software may include instructions stored in memory 38 that, when executed by the processor 40 and/or negotiation requestor 22, causes the processing circuitry 36 and/or configures the NE node 14 to perform the processes described herein with respect to the NE node 14 (e.g., processes described with reference to FIG. 4 and/or any of the other figures).

The policy node 16 includes a communication interface 42, processing circuitry 44, and memory 46. The communication interface 42 may be configured to communicate with one or more of other elements in the system 10 to facilitate support for NPNs according to one or more of the techniques in the present disclosure. In some embodiments, the communication interface 42 may be formed as or may include, for example, one or more radio frequency (RF) transmitters, one or more RF receivers, and/or one or more RF transceivers, and/or may be considered a radio interface. In some embodiments, the communication interface 42 may also include a wired interface.

The processing circuitry 44 may include one or more processors 48 and memory, such as, the memory 46. In particular, in addition to a traditional processor and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the policy node 16 may further include software stored internally in, for example, memory 46, or stored in external memory (e.g., database) accessible by the policy node 16 via an external connection. The software may be executable by the processing circuitry 44. The processing circuitry 44 may be configured to control any of the methods and/or processes described herein and/or to cause such methods, and/or processes to be performed, e.g., by the policy node 16. The memory 46 is configured to store data, programmatic software code and/or other information described herein. In some embodiments, the software may include instructions stored in memory 46 that, when executed by the processor 48 and/or policy provider 24 causes the processing circuitry 44 and/or configures the policy node 16 to perform the processes described herein with respect to the policy node 16 such as the processes described with reference to FIG. 5 and the other figures.

The network node 18 (e.g., AF, UDR, etc.) includes a communication interface 50, processing circuitry 52, and memory 54. The communication interface 50 may be configured to communicate with one or more of other elements in the system 10 to facilitate support for NPNs according to one or more of the techniques in the present disclosure. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 18 may further include software stored internally in, for example, memory 54, or stored in external memory (e.g., database) accessible by the network node 18 via an external connection. The software may be executable by the processing circuitry 52. The processing circuitry 52 may be configured to control any of the methods and/or processes described herein and/or to cause such methods, and/or processes to be performed, e.g., by the network node 18. The memory 54 is configured to store data, programmatic software code and/or other information described herein. In some embodiments, the software may include instructions stored in memory 54 that, when executed by the processor 56, causes the processing circuitry 52 and/or configures the network node 18 to perform the processes described herein with respect to the network node 18 (e.g., AF, UDR, etc.) such as the processes described with respect any of the figures.

Although FIG. 2 shows policy user 20, negotiation requestor 22 and policy provider 24, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

FIG. 3 is a flowchart of an example process in a UE 12 according to the arrangements disclosed herein. One or more Blocks and/or functions and/or methods performed by the UE 12 may be performed by one or more elements of UE 12 such as by policy user 20 in processing circuitry 28, memory 30, processor 32, communication interface 26, etc. according to the example process/method. The method includes obtaining (Block S100), such as via policy user 20, processing circuitry 28, memory 30, processor 32 and/or communication interface 26, from a policy node 16 of a first network, a UE 12 route selection policy (URSP) associated with an application. The method includes based at least in part on the URSP, determining (Block S102), such as via policy user 20, processing circuitry 28, memory 30, processor 32 and/or communication interface 26, from a policy node 16 of a first network, whether the application is to be transferred to another network, the other network being different from the first network.

In some embodiments, at least one of: the URSP includes a route selection descriptor (RSD), the RSD indicates a preferred access type, the preferred access type including a network identifier; the network identifier identifies the other network, the other network being different from the first network that the UE 12 is registered to; the URSP including a traffic descriptor including a rule correlation identifier associated with the application identifier; the first network is a standalone non-public network (SNPN) and the second network is a public land mobile network (PLMN); and/or the application is a Video, Imaging and Audio for Professional Application (VIAPA) application. In some embodiments, the method further includes establishing a protocol data unit (PDU) session via one of the first network and the other network according to a transfer policy indicated in the obtained URSP.

FIG. 4 is a flowchart of an example process in a NE node 14 according to the arrangements disclosed herein. One or more Blocks and/or functions and/or methods performed by the NE node 14 may be performed by one or more elements of NE node 14 such as by negotiation requestor 22 in processing circuitry 36, memory 38, processor 40, communication interface 34, etc. according to the example process/method. The method includes receiving (Block S106), such as via negotiation requestor 22, processing circuitry 36, memory 38, processor 40 and/or communication interface 34, a negotiation of transfer policy request. The method includes as a result of the received negotiation of transfer policy request, identifying (Block S108), such as via negotiation requestor 22, processing circuitry 36, memory 38, processor 40 and/or communication interface 34, a policy node to receive the request and/or send the request to the policy node 16.

In some embodiments, at least one of: the negotiation of transfer policy request indicates a plurality of user equipments 12 (UEs 12) that are to use an application, a time and/or a date that the plurality of UEs 12 are to use the application; the negotiation of transfer policy request is received from an application function (AF) node; the policy node 16 is a policy node 16 of a standalone non-public network (SNPN); and/or the AF node is associated with an application service provider (ASP) portal for Video, Imaging and Audio for Professional Application (VIAPA) application services. In some embodiments, the method further includes as a result of sending the request, receiving, from the policy node, a negotiate transfer policy response including a standalone non-public network (SNPN) transfer policy identifier; and/or as a result of the received response, sending the negotiate transfer policy response including the SNPN transfer policy identifier to the AF node, the response indicating whether at least one of the plurality of UEs 12 may experience a Quality-of-service (QoS) degradation.

Figure 5:
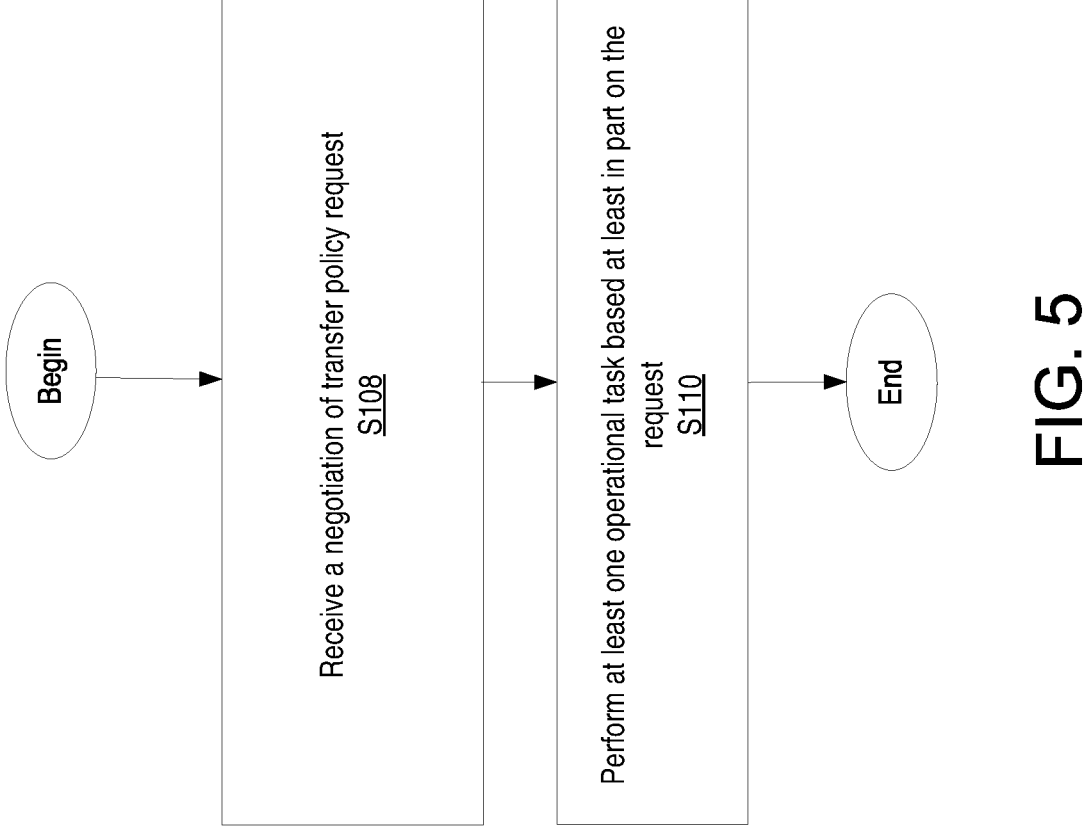
FIG. 5 is a flowchart of an example process in a policy node according to some embodiments of the present disclosure.

FIG. 5 is a flowchart of an example process in a policy node 16 according to the arrangements disclosed herein. One or more Blocks and/or functions and/or methods performed by the policy node 16 may be performed by one or more elements of policy node 16 such as by policy provider 24 in processing circuitry 44, memory 46, processor 48, communication interface 42, etc. according to the example process/method. The method includes receiving (Block S108), such as via policy provider 24, processing circuitry 44, memory 46, processor 48 and/or communication interface 42, a negotiation of transfer policy request. The method includes performing (Block S110), such as via policy provider 24, processing circuitry 44, memory 46, processor 48 and/or communication interface 42, at least one operational task based at least in part on the request.

In some embodiments, the at least one operational task include one or more of: subscribing to an analytics service for a probability associated with Quality-of-service (QoS) sustainability for a QoS flow corresponding to an application; determining whether to request to negotiate a transfer policy with another policy node for the application; storing, at a data repository (DR) node, the negotiated transfer policy and a corresponding rule identifier for at least one user equipment (UE 12) that is to transfer the application to a different network than the network the UE 12 is registered to; and/or providing a UE 12 route selection policy (URSP) rule indicating the negotiated transfer policy. In some embodiments, one or more of: the URSP includes a route selection descriptor (RSD), the RSD indicates a preferred access type, the preferred access type including a network identifier; the network identifier identifies a different network than a network the UE 121 is registered to; the URSP includes a traffic descriptor including a rule correlation identifier associated with the application identifier; and/or the application is a Video, Imaging and Audio for Professional Application (VIAPA) application.

FIG. 6 is a flowchart of an example process in a UE 12 according to the arrangements disclosed herein. One or more Blocks and/or functions and/or methods performed by the UE 12 may be performed by one or more elements of UE 12 such as by policy user 20 in processing circuitry 28, memory 30, processor 32, communication interface 26, etc. according to the example process/method. The method includes obtaining (Block S112), such as by policy user 20 in processing circuitry 28, memory 30, processor 32 and/or communication interface 26, a transfer policy from a policy node 16 of a first network, the transfer policy being associated with a network selection for an application. The method includes determining (Block S114), such as by policy user 20 in processing circuitry 28, memory 30, processor 32 and/or communication interface 26, whether the application is to be transferred from using the first network to using a second network based at least in part on the obtained transfer policy, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE 12 has a subscription to the second network.

In some embodiments, the QoS information comprises at least one of: at least one Quality-of-service, QoS, requirement for the application; a Quality-of-service, QoS, sustainability prediction for a plurality of user equipments 12, UEs 12, that are expected to use the application; and a Quality-of-service, QoS, degradation prediction for at least one UE 12 out of a plurality of user equipments 12, UEs 12, that are expected to use the application. In some embodiments, the method further includes sending, such as by policy user 20 in processing circuitry 28, memory 30, processor 32 and/or communication interface 26, traffic associated with the application over one of the first network and the second network based at least in part on the determination.

In some embodiments, the UE 12 is registered to the first network and the method further comprises: as a result of a determination to transfer the application to the second network, registering, such as by policy user 20 in processing circuitry 28, memory 30, processor 32 and/or communication interface 26, to the second network and establishing a protocol data unit, PDU, session in the second network; and sending, such as by policy user 20 in processing circuitry 28, memory 30, processor 32 and/or communication interface 26, traffic associated with the application over the second network via the established PDU session.

In some embodiments, the UE 12 is registered to the first network and the method further comprises: as a result of a determination to not transfer the application to the second network, sending, such as by policy user 20 in processing circuitry 28, memory 30, processor 32 and/or communication interface 26, traffic associated with the application over the first network that the UE 12 is registered to. In some embodiments, the UE 12 has a first subscription to the first network and a second subscription to the second network. In some embodiments, at least one of: the transfer policy indicates a date and/or a time during which the transfer policy is valid; the transfer policy indicates a location at which the transfer policy is valid; and the location, the date and/or the time indicated in the transfer policy corresponding to an expected use of the application at a pre-determined event associated with the SNPN. In some embodiments, the method further includes when the transfer policy becomes invalid according to the location, the date and/or the time indicated in the transfer policy, discarding the transfer policy.

In some embodiments, the transfer policy indicates a network identifier, the network identifier identifying one of the first network and the second network to which the application is to be transferred to. In some embodiments, the transfer policy indicates an application identifier, the application identifier identifying the application that is to be transferred according to the transfer policy.

In some embodiments, the transfer policy indicates a preferred access type, the preferred access type comprising a network identifier identifying one of the first network and the second network to which the application is to be transferred to. In some embodiments, the transfer policy indicates a route selection descriptor, RSD, the RSD indicating the preferred access type and the network identifier. In some embodiments, the transfer policy includes information indicating a traffic associated with the application. In some embodiments, the information is comprised in a traffic descriptor, the traffic descriptor identifying the application that is to be transferred according to the transfer policy.

In some embodiments, the traffic descriptor further comprises a rule correlation identifier, ID; the method further comprising determining, such as by policy user 20 in processing circuitry 28, memory 30, processor 32 and/or communication interface 26, whether the rule correlation ID is a same for both the first network and the second network; and sending, such as by policy user 20 in processing circuitry 28, memory 30, processor 32 and/or communication interface 26, traffic to one of the first network and the second network based at least in part on whether the rule correlation ID is the same. In some embodiments, the application is identified in the transfer policy as a Video, Imaging and Audio for Professional Application, VIAPA, application. In some embodiments, the transfer policy is a UE 12 route selection policy, URSP, and the policy node comprises a policy control function, PCF.

FIG. 7 is a flowchart of an example process in a NE node 14 according to the arrangements disclosed herein. One or more Blocks and/or functions and/or methods performed by the NE node 14 may be performed by one or more elements of NE node 14 such as by negotiation requestor 22 in processing circuitry 36, memory 38, processor 40, communication interface 34, etc. according to the example process/method. The method includes receiving (Block S116), such as via negotiation requestor 22, processing circuitry 36, memory 38, processor 40 and/or communication interface 34, a transfer policy request, the transfer policy request being associated with an application and the transfer policy request being related to a network selection for the application. The method includes as a result of the received transfer policy request, sending (Block S118), such as via negotiation requestor 22, processing circuitry 36, memory 38, processor 40 and/or communication interface 34, the transfer policy request to a policy node associated with a first network. The method includes receiving (Block S120), such as via negotiation requestor 22, processing circuitry 36, memory 38, processor 40 and/or communication interface 34, a transfer policy response identifying a transfer policy, the transfer policy indicating whether the application is to be transferred to using a second network, the second network being different from the first network associated with the policy node 16, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE 12 has a subscription to the second network.

In some embodiments, the QoS information comprises at least one of: at least one Quality-of-service, QoS, requirement for the application; a Quality-of-service, QoS, sustainability prediction for a plurality of user equipments 12, UEs 12, that are expected to use the application; and a Quality-of-service, QoS, degradation prediction for at least one UE 12 out of a plurality of user equipments 12, UEs 12, that are expected to use the application. In some embodiments, the transfer policy request indicates at least one of a plurality of user equipments 12, UEs 12, that are expected to use the application, a time and/or a date that the plurality of UEs 12 are expected to use the application and at least one Quality-of-service, QoS, requirement for the application. In some embodiments, the transfer policy request is received from an application function, AF, node associated with the application. In some embodiments, the AF node is associated with an application service provider, ASP, portal for a Video, Imaging and Audio for Professional Application, VIAPA, application service.

In some embodiments, the method further includes sending, such as via negotiation requestor 22, processing circuitry 36, memory 38, processor 40 and/or communication interface 34, the transfer policy response identifying the transfer policy to an application function, AF, node associated with the application. In some embodiments, the transfer policy response comprises a transfer policy identifier, ID, identifying the transfer policy. In some embodiments, at least one of: the transfer policy indicates a date and/or a time during which the transfer policy is valid; the transfer policy indicates a location at which the transfer policy is valid; and the location, the date and/or the time indicated in the transfer policy corresponding to an expected use of the application at a pre-determined event associated with the SNPN. In some embodiments, the transfer policy becomes invalid according to the location, the date and/or the time indicated in the transfer policy. In some embodiments, the transfer policy indicates a network identifier, the network identifier identifying one of the first network and the second network to which the application is to be transferred to. In some embodiments, the transfer policy indicates an application identifier, the application identifier identifying the application that is to be transferred according to the transfer policy. In some embodiments, the transfer policy indicates a preferred access type, the preferred access type comprising a network identifier identifying one of the first network and the second network to which the application is to be transferred to.

In some embodiments, the transfer policy indicates a route selection descriptor, RSD, the RSD indicating the preferred access type and the network identifier. In some embodiments, the transfer policy includes information indicating a traffic associated with the application. In some embodiments, the information is comprised in a traffic descriptor, the traffic descriptor identifying the application that is to be transferred according to the transfer policy. In some embodiments, the traffic descriptor further comprises a rule correlation identifier, ID. In some embodiments, the transfer policy is a UE route selection policy, URSP, and the policy node 16 comprises a policy control function, PCF.

FIG. 8 is a flowchart of an example process in a policy node 16 according to the arrangements disclosed herein. One or more Blocks and/or functions and/or methods performed by the policy node 16 may be performed by one or more elements of policy node 16 such as by policy provider 24 in processing circuitry 44, memory 46, processor 48, communication interface 42, etc. according to the example process/method. The method includes receiving (Block S122), such as via policy provider 24, processing circuitry 44, memory 46, processor 48 and/or communication interface 42, a transfer policy request, the transfer policy request being associated with an application, the transfer policy request being related to a network selection for the application and the policy node 16 being associated with a first network. The method includes sending (Block S124), such as via policy provider 24, processing circuitry 44, memory 46, processor 48 and/or communication interface 42, a transfer policy response identifying a transfer policy, the transfer policy indicating whether the application is to be transferred to using a second network, the second network being different from the first network associated with the policy node 16, the first network being one of a standalone non-public network, SNPN, and a public land mobile network, PLMN and the second network being another one of the SNPN and the PLMN and the transfer policy being based at least in part on at least one of: (i) Quality-of-service, QoS, information associated with the application and (ii) whether the UE 12 has a subscription to the second network.

In some embodiments, the method further includes determining, such as via policy provider 24, processing circuitry 44, memory 46, processor 48 and/or communication interface 42, the transfer policy, the transfer policy being based at least in part on at least one of: at least one Quality-of-service, QoS, requirement for the application; a Quality-of-service, QoS, sustainability for a plurality of user equipments 12, UEs 12, that are expected to use the application; and a Quality-of-service, QoS, degradation for at least one UE 12 out of the plurality of UEs 12 that are expected to use the application.

In some embodiments, the method further includes sending, such as via policy provider 24, processing circuitry 44, memory 46, processor 48 and/or communication interface 42, the transfer policy to a user equipment, UE 12. In some embodiments, the transfer policy request indicates at least one of a plurality of user equipments 12, UEs 12, that are expected to use the application, a time and/or a date that the plurality of UEs 12 are expected to use the application and at least one Quality-of-service, QoS, requirement for the application. In some embodiments, the transfer policy request is received from a network exposure, NE, node 14. In some embodiments, the application is a Video, Imaging and Audio for Professional Application, VIAPA, application. In some embodiments, the transfer policy response comprises a transfer policy identifier, ID, identifying the transfer policy. In some embodiments, at least one of: the transfer policy indicates a date and/or a time during which the transfer policy is valid; the transfer policy indicates a location at which the transfer policy is valid; and the location, the date and/or the time indicated in the transfer policy corresponding to an expected use of the application at a pre-determined event associated with the SNPN. In some embodiments, the transfer policy becomes invalid according to the location, the date and/or the time indicated in the transfer policy. In some embodiments, the transfer policy indicates a network identifier, the network identifier identifying one of the first network and the second network to which the application is to be transferred to.

In some embodiments, the transfer policy indicates an application identifier, the application identifier identifying the application that is to be transferred according to the transfer policy. In some embodiments, the transfer policy indicates a preferred access type, the preferred access type comprising a network identifier identifying one of the first network and the second network to which the application is to be transferred to. In some embodiments, the transfer policy indicates a route selection descriptor, RSD, the RSD indicating the preferred access type and the network identifier. In some embodiments, the transfer policy includes information indicating a traffic associated with the application. In some embodiments, the information is comprised in a traffic descriptor, the traffic descriptor identifying the application that is to be transferred according to the transfer policy. In some embodiments, the traffic descriptor further comprises a rule correlation identifier, ID. In some embodiments, the transfer policy is a UE route selection policy, URSP, and the policy node 16 comprises a policy control function, PCF.

Having generally described arrangements for policy based selection of a network, a more detailed description of some of the embodiments are provided as follows with reference to the call flow diagram in FIG. 9, and which may be implemented by UE 12, NE node 14, policy node 16 and network node 18 (e.g., UDM, AF, etc.).

In some embodiments, one or more of the following sequence of events may be performed by, e.g., UE 12, NE node 14, policy node 16 and/or network node 18, e.g., AF/ASP node (e.g., AF node 58 in FIG. 9), UDR (e.g., DR nodes 60*a* and 60*b* in FIG. 9), etc., in one example to, e.g., determine which network the UE 12 should use for a particular SNPN service (e.g., the SNPN or a PLMN that UE 12 is also subscribed to):

1. The application service provider (ASP) (e.g., AF node 58) offering a Video, Imaging and Audio for Professional Application (VIAPA) service sells tickets to end users via a Web portal. The ASP has a business agreement with an SNPN for delivering the VIAPA service.
2. The UE 12 has a subscription with the SNPN and with a PLMN.
3. The SNPN has a business agreement with a list of PLMNs.
4. Sometime before the music festival starts the ASP, via AF node (e.g., AF node 58), provides to the SNPN as part of the business agreement information on: VIAPA application identification (ID), the number of users/UEs 12 and the list of users/UEs 12 that may consume the VIAPA service. The SNPN (e.g., via policy node 16) checks the QoS requirements (e.g., 5G QoS identifier (5QI), packet error rate (PER) or packet delay budget (PDB)), subscribes to Analytics on QoS sustainability predictions for these QoS requirements and the policy node 16 determines a threshold for reporting. If the Analytics reports that the threshold is reached, this may indicate that there is a likelihood that the QoS will change and therefore QoS degradation or service termination may be experienced by the VIAPA users (i.e., the UEs 12 running the application associated with the VIAPA application ID).

5. The SNPN (e.g., SNPN policy node 16) contacts those PLMNs (e.g., PLMN policy nodes 16) where the UE 12 has a subscription to provide the requirements for VIAPA applications. The PLMN (e.g., PLMN policy node 16) informs the SNPN network (e.g., via SNPN policy node 16) that the VIAPA application for a number of users/UEs 12, including the list of users can be delivered using the PLMN.

6. The SNPN (e.g., SNPN policy node 16) configures a policy such as a transfer policy, e.g., a URSP rule to the UE 12 to use either the SNPN or the PLMN for a VIAPA application and preferred access type. If the VIAPA service is to be delivered via the PLMN, the PLMN (e.g., via PLMN policy node 16) configures the policy, e.g., a URSP rule to the UE 12 with the protocol data unit (PDU) session information.

In some embodiments, another alternative may be that the ASP (e.g., AF node 58) negotiates which users/UEs 12 will consume VIAPA services via a PLMN or via the SNPN. In this case, one or more of the following steps may be performed (by e.g., UE 12, NE node 14, policy node 16 and/or network node 18, e.g., AF node 58, DR node 60):

1. The ASP offering a VIAPA service sells tickets to end users via a Web portal. The ASP has a business agreement with an SNPN and a number of PLMN for delivering the VIAPA service.

2. The UE 12 has a subscription with the SNPN and with a PLMN.

3. Sometime before the music festival starts the ASP, via AF node 58, subscribes to Analytics on QoS sustainability predictions for this QoS requirements to the SNPN. The AF node 58 determines a threshold for reporting. If the Analytics reports that the threshold is reached, this may indicate that there is a likelihood that QoS will change and therefore QoS degradation or service termination may be experienced by the VIAPA users. The AF node 58 checks with other PLMNs where UEs 12 have a subscription.

4. The AF node 58 contacts those PLMNs where the UEs 12 have a subscription to provide the requirements for the VIAPA application. The PLMN (e.g., via PLMN policy node 16) informs the AF node 58 that the VIAPA application for a number of users/UEs 12, including the list of users/UEs 12 can be delivered using the PLMN.

5. The AF node 58 provides connectivity information for those UEs 12 that are transferred via SNPN or via PLMN to both the PLMNs (e.g., via PLMN policy nodes 16) and SNPN (e.g., via SNPN policy node 16).

6. Both the PLMN and the SNPN (e.g., via the respective policy nodes 16) configures policies (e.g., URSP rules) to the UEs 12 to route VIAPA applications in PDU sessions. The policy (e.g., URSP rule) indicates the preferred network (NW, e.g., SNPN or PLMN) to route the VIAPA application traffic.

Figure 9:
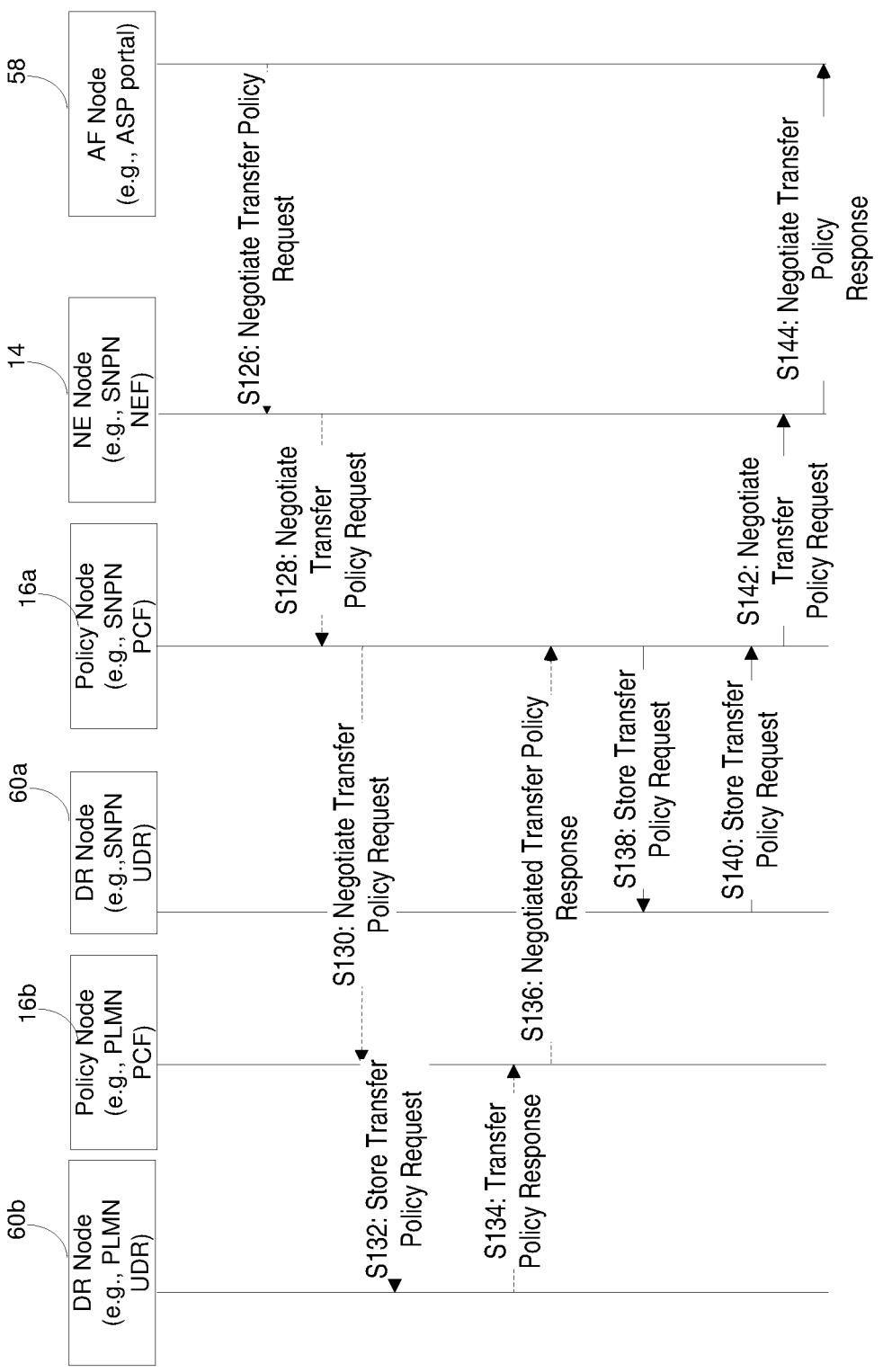
FIG. 9 is a call flow diagram that illustrates an example procedure to support NPN services according to some embodiments of the present disclosure.

Referring to FIG. 9, steps in one example call flow are described relating to determination and configuration of a transfer policy according to one embodiment of the present disclosure:

1. S126 (relates to a negotiate transfer policy request from an ASP node to an NE node 14): A web portal at the ASP node 58 offers tickets to VIAPA application to end users/UEs 12. At some point in time, before the VIAPA application starts, the ASP node 58 informs the SNPN via the NE node 14, using Nnef_Negotiate_Transfer_Policy Request service operation that a number of users, list of users, will use a VIAPA application, at certain time and location corresponding to, e.g., a music festival time and location.

2. S128 (relates to a negotiate transfer policy request from an NE node 14 to a SNPN policy node): The SNPN NE node 14 authorizes the ASP request, selects and then sends a Npcf_Negotiate_Transfer_Policy Request to the SNPN policy node 16a to receive the ASP request; the policy node 16a can be any PCF supporting this capability or service. The SNPN policy node 16a checks the QoS requirements for the VIAPA application, the number of users and their location/time and determines (using local policies and analytics on the "QoS sustainability" in the location (i.e., gNB) where UEs 12 would be located, and the 5QI of the VIAPA application) if the SNPN policy node 16a estimates that the users of the VIAPA application would not experience QoS degradation. If the QoS sustainability threshold is not met then step S138 may take place.

3. S130 (relates to a negotiate transfer policy request from an SNPN policy node to a PLMN policy node): The SNPN policy node 16a may decide that QoS sustainability threshold will not be met and then check with any PLMN policy node 16b (policy nodes 16a and 16b are referred to collectively herein as policy node 16) that has a business relation to run traffic from UEs 12 of the SNPN that accepts a request to run a VIAPA application. The SNPN policy node 16a checks the UEs 12 that have a subscription on that PLMN, and sends a Npcf_Negotiate_Transfer_Policy Request service operation to the PLMN policy node 16b to indicate that a number of UEs 12 will send VIAPA traffic at a certain time and location, and the list of UEs 12.

4. S132 (relates to a store transfer policy request from a PLMN policy node to a PLMN DR node): The PLMN policy node 16b checks that those UEs 12 have a policy subscription, then the QoS requirements for the VIAPA application, the number of UEs 12 and their location/time and determines (using local policies and analytics on the "QoS sustainability" in the location (i.e., gNB) where UEs 12 would be located, and the 5QI of the VIAPA application) if the SNPN policy node 16a estimates that the UEs 12 of the VIAPA application would not experience QoS degradation. If the QoS sustainability threshold is not met then the PLMN policy node 16b accepts the request to transfer VIAPA applications, generates a PLMN transfer policy (e.g., URSP rule) and stores such transfer policy (e.g., URSP rule) in the PLMN DR node 60b (e.g., UDR), together with the list of UEs 12 that will use it using Nudr_DM_Create_Request for Data Set Application data.

5. S134 (relates to a transfer policy response from a PLMN DR node to a PLMN policy node): The PLMN DR node 60b sends a Nudr_DM_Creat_Response to the PLMN policy node 16b.

6. S136 (relates to a negotiated transfer policy response from a PLMN policy node to a SNPN policy node): The PLMN policy node 16b sends a Npcf_Negotiate_Transfer_Policy Request or Response including the transfer policy identifier (ID), e.g., PLMN_URSP_rule_Id to the SNPN policy node 16a. The SNPN policy node 16a includes the transfer policy ID, e.g., PLMN URSP rule ID and the list of UEs 12 that such rule applies to, as part of the SNPN Transfer Policy stored in the UDR.

7. S138 (relates to a store transfer policy request from a SNPN policy node to a SNPN DR node): The SNPN policy node 16*a* stores the transfer policy ID, e.g., SNPN_Transfer_Policy Id and its context into SNPN DR node 60*a* using Nudr_DM_Create_Request for Data Set Application data.

8. S140 (relates to a store transfer policy request or response from a SNPN DR node to a SNPN policy node): The SNPN DR node 60*a* sends a Nudr_DM_Creat_Response to the SNPN policy node 16*a*.

9. S142 (relates to a negotiate transfer policy request from a SNPN policy node to a NE node): The SNPN policy node 16*a* sends a Npcf_Negotiate_Transfer_Policy Request to the SNPN NE node 14 including the transfer policy ID, e.g., SNPN_Transfer_Policy_Id.

10. S144 (relates to a negotiate transfer policy response from an NE node to an AF node): The SNPN NE node 14 sends a Nnef_Negotiate_Transfer_Policy Response including the transfer policy ID, e.g., SNPN_Transfer_Policy_id which may indicate whether some UEs 12 may experience QoS degradation based on predictions and/or whether one or more of such UEs 12 are to be configured with a transfer policy indicating to use the SNPN or PLMN.

In some embodiments, an alternative may include defining a network function (NF) that monitors the available guaranteed bit rate (GBR) in a gNB network node, and then checks if there will be the GBR for the QoS flows of the VIAPA application and subtracts it from the total available in the gNB network node. Thus, in some embodiments, it may be guaranteed that there will be enough GBR for the VIAPA application.

In some embodiments, where, e.g., a URSP rule is used as the transfer policy, the following example extensions of the route selection descriptor (RSD) in the URSP rule are shown and an example of how to use it are described below:

TABLE 1

| | | | Route Selection Descriptor extended with "Network id" | | |
| Information name | Description | Category | PCF permitted to modify in URSP | Scope |
| --- | --- | --- | --- | --- |
| Route selection components | This part defines the route selection components | Mandatory | | |
| Access Type preference | Indicates the preferred Access Type (3GPP or non-3GPP or Multi-Access) when the UE establishes a PDU Session for the matching application. The preferred access type may include a NW id, which is different from the NW where the UE is correctly registered. | Optional | Yes | UE context |

TABLE 2

| SNPN URSP rules to route VIAPA App1 though 3GPP access of PLMN_1 | |
| --- | --- |
| Example SNPN URSP rules | Comments |
| Traffic descriptor: VIAPA App1, Rule-correlation-ID Route Selection Descriptor Precedence = 1 Access Type preference: 3GPP access, PLMN id_1, | This SNPN URSP rule associates the traffic of application "VIAPA App1" with 3GPP access of the PLMN_id_1. The Rule-correlation-ID is used to ensure that the source network does not attempt to move traffic to another network that has not agreed to accept the traffic. |

TABLE 3

| PLMN URSP rules to route VIAPA App1 though 3GPP access of PLMN_1 | |
| --- | --- |
| Example PLMN URSP rules (PLMN_URSP_1) | Comments |
| Traffic descriptor: VIAPA App1, Rule-correlation-ID Route Selection Descriptor Precedence = 1 Network Slice Selection: S-NSSAI-b SSC Mode Selection: SSC Mode 3 DNN Selection: internet Access Type preference: 3GPP access | This PLMN URSP rule associates the traffic of application "VIAPA App1" with S-NSSAI-a, SSC Mode 3, the "internet" DNN and 3GPP Access. The Rule-correlation-ID is used to ensure that the source network does not attempt to move traffic to another network that has not agreed to accept the traffic. |

In some embodiments, the UE 12 that starts to register to the SNPN and obtains the SNPN transfer policy e.g., URSP rule described in e.g., Table 2 above will register to the PLMN (it has a subscription for) and obtains the PLMN transfer policy e.g., URSP listed in Table 3. In some embodiments, an optional Rule-correlation-ID may be provided, and if provided the UE 12 checks/determines that the transfer policy e.g., URSP rule applies for the VIAPA App1 and may check/determine that the same Rule-correlation-ID is provided in the transfer policies e.g., URSP rules from both networks.

Some embodiments may include one or more of the following embodiments:

Embodiment A1. A method implemented in a user equipment, UE 12, the method comprising:

obtaining, from a policy node 16 of a first network, a UE route selection policy, URSP, associated with an application; and based at least in part on the URSP, determining whether the application is to be transferred to another network, the other network being different from the first network.

Embodiment A2. The method of Embodiment A1, wherein at least one of:

the URSP includes a route selection descriptor, RSD, the RSD indicates a preferred access type, the preferred access type including a network identifier;

the network identifier identifies the other network, the other network being different from the first network that the UE 12 is registered to;

the URSP including a traffic descriptor including a rule correlation identifier associated with the application identifier;

the first network is a standalone non-public network, SNPN, and the second network is a public land mobile network, PLMN; and/or the application is a Video, Imaging and Audio for Professional Application, VIAPA, application.

Embodiment A3. The method of any one of Embodiments A1 and A2, wherein the method further comprises:

establishing a protocol data unit, PDU, session via one of the first network and the other network according to a transfer policy indicated in the obtained URSP.

Embodiment B1. A user equipment, UE 12, configured to and/or comprising processing circuitry 28 and/or comprising a communication interface 26 configured to cause the UE 12 to:

obtain, from a policy node of a first network, a UE route selection policy, URSP, associated with an application; and based at least in part on the URSP, determine whether the application is to be transferred to another network, the other network being different from the first network.

Embodiment B2. The UE 12 of Embodiment B1, wherein at least one of:

the URSP includes a route selection descriptor, RSD, the RSD indicates a preferred access type, the preferred access type including a network identifier;

the network identifier identifies the other network, the other network being different from the first network that the UE 12 is registered to;

the URSP including a traffic descriptor including a rule correlation identifier associated with the application identifier;

the first network is a standalone non-public network, SNPN, and the second network is a public land mobile network, PLMN; and/or the application is a Video, Imaging and Audio for Professional Application, VIAPA, application.

Embodiment B3. The UE 12 of any one of Embodiments B1 and B2, wherein the UE 12 and/or the processing circuitry 28 and/or the communication interface is further configured to cause the UE 12 to:

establish a protocol data unit, PDU, session via one of the first network and the other network according to a transfer policy indicated in the obtained URSP.

Embodiment C1. A method implemented in a network exposure, NE, node 14, the method comprising:

receiving a negotiation of transfer policy request; and as a result of the received negotiation of transfer policy request, identifying a policy node 16 to receive the request and/or send the request to the policy node 16.

Embodiment C2. The method of Embodiment C1, wherein at least one of:

the negotiation of transfer policy request indicates a plurality of user equipments 12, UEs 12, that are to use an application, a time and/or a date that the plurality of UEs 12 are to use the application;

the negotiation of transfer policy request is received from an application function, AF, node;

the policy node 16 is a policy node 16 of a standalone non-public network, SNPN; and/or the AF node is associated with an application service provider, ASP, portal for Video, Imaging and Audio for Professional Application, VIAPA, application services.

Embodiment C3. The method of any one of Embodiments C1 and C2, further comprising:

as a result of sending the request, receiving, from the policy node 16, a negotiate transfer policy response including a standalone non-public network, SNPN, transfer policy identifier; and/or as a result of the received response, sending the negotiate transfer policy response including the SNPN transfer policy identifier to the AF node, the response indicating whether at least one of the plurality of UEs 12 may experience a Quality-of-service, QoS, degradation.

Embodiment D1. A network exposure, NE, node 14 configured to and/or comprising processing circuitry 36 and/or comprising a communication interface 34 configured to cause the NE node 14 to:

receive a negotiation of transfer policy request; and as a result of the received negotiation of transfer policy request, identify a policy node to receive the request and/or send the request to the policy node 16;

Embodiment D2. The NE node 14 of Embodiment D1, wherein at least one of:

the negotiation of transfer policy request indicates a plurality of user equipments 12, UEs 12, that are to use an application, a time and/or a date that the plurality of UEs 12 are to use the application;

the negotiation of transfer policy request is received from an application function, AF, node;

the policy node 16 is a policy node 16 of a standalone non-public network, SNPN; and/or the AF node is associated with an application service provider, ASP, portal for Video, Imaging and Audio for Professional Application, VIAPA, application services.

Embodiment D3. The NE node 14 of any one of Embodiments D1 and D2, wherein the NE node 14 and/or the processing circuitry 36 and/or the communication interface 34 is further configured to cause the NE node 14 to:

as a result of sending the request, receive, from the policy node 16, a negotiate transfer policy response including a standalone non-public network, SNPN, transfer policy identifier; and/or as a result of the received response, send the negotiate transfer policy response including the SNPN transfer policy identifier to the AF node, the response indicating whether at least one of the plurality of UEs 12 may experience a Quality-of-service, QoS, degradation.

Embodiment E1. A method implemented in a policy node 16, the method comprising:

receiving a negotiation of transfer policy request; and performing at least one operational task based at least in part on the request.

Embodiment E2. The method of Embodiment E1, wherein the at least one operational task include one or more of:

subscribing to an analytics service for a probability associated with Quality-of-service, QoS, sustainability for a QoS flow corresponding to an application;

determining whether to request to negotiate a transfer policy with another policy node 16 for the application;

storing, at a data repository, DR, node, the negotiated transfer policy and a corresponding rule identifier for at least one user equipment, UE 12, that is to transfer the application to a different network than the network the UE 12 is registered to; and/or providing a UE route selection policy, URSP, rule indicating the negotiated transfer policy.

Embodiment E3. The method of any one of Embodiments E1 and E2, wherein one or more of:

the URSP includes a route selection descriptor, RSD, the RSD indicates a preferred access type, the preferred access type including a network identifier;

the network identifier identifies a different network than a network the UE 12 is registered to;

the URSP includes a traffic descriptor including a rule correlation identifier associated with the application identifier; and/or the application is a Video, Imaging and Audio for Professional Application, VIAPA, application.

Embodiment F1. A policy node 16 configured to and/or comprising processing circuitry 44 and/or comprising a communication interface 42 configured to cause the policy node 16 to:

receive a negotiation of transfer policy request; and perform at least one operational task based at least in part on the request.

Embodiment F2. The policy node 16 of Embodiment F1, wherein the at least one operational task includes one or more of:

subscribing to an analytics service for a probability associated with Quality-of-service, QoS, sustainability for a QoS flow corresponding to an application;

determining whether to request to negotiate a transfer policy with another policy node 16 for the application;

store, at a data repository, DR, node, the negotiated transfer policy and a corresponding rule identifier for at least one user equipment, UE 12, that is to transfer the application to a different network than the network the UE 12 is registered to; and/or provide a UE 12 route selection policy, URSP, rule indicating the negotiated transfer policy.

Embodiment F3. The policy node 16 of any one of Embodiments F1 and F2, wherein one or more of:

the URSP includes a route selection descriptor, RSD, the RSD indicates a preferred access type, the preferred access type including a network identifier;

the network identifier identifies a different network than a network the UE 12 is registered to;

the URSP includes a traffic descriptor including a rule correlation identifier associated with the application identifier; and/or the application is a Video, Imaging and Audio for Professional Application, VIAPA, application.

Some embodiments may be described with reference to one or more of the following abbreviations:

| Abbreviation | Explanation |
| --- | --- |
| 5GC | 5G Core |
| AF | Application Function |
| AMF | Access and Mobility Management Function |
| ASP | Application Service Provider |
| CP | Control Plane |
| DNS | Domain Name System |
| FQDN | Fully Qualified Domain Name |
| PCF | Policy Control Function |
| PEI | Permanent Equipment Identifier |
| PLMN | Public Land Mobile Network |
| NEF | Network Exposure Function |
| NID | Network Identifier |
| SBI | Service Based Interface |
| SEPP | Security Edge Protection Proxy |
| SNPN | Standalone Non-Public Network |
| SUPI | Subscription Permanent Identifier |
| UE | User Equipment |
| UP | User Plane |
| URSP | UE Route Selection Policy |

As will be appreciated by one of skill in the art, the concepts described herein may be embodied as a method, data processing system, and/or computer program product.

Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a user equipment, UE, the method comprising:
   obtaining a transfer policy from a policy node of a first network, the transfer policy being associated with a network selection for an application; and
   determining whether the application is to be transferred from using the first network to using a second network based at least in part on the obtained transfer policy, the first network being one of a standalone non-public network, SNPN, and a public land mobile network, PLMN and the second network being another one of the SNPN and the PLMN and the transfer policy being based at least in part on Quality-of-service, QoS, information associated with the application,
   wherein the QoS information comprises a Quality-of-service, QoS, sustainability prediction for a plurality of user equipments, UEs, that are expected to use the application.

2. The method of claim 1, further comprising:
   sending traffic associated with the application over one of the first network and the second network based at least in part on the determination.

3. The method of claim 1, wherein the UE is registered to the first network and
   the method further comprises:
      as a result of a determination to transfer the application to the second network, registering to the second network and establishing a protocol data unit, PDU, session in the second network; and
      sending traffic associated with the application over the second network via the established PDU session.

4. The method of claim 1, wherein the UE is registered to the first network and
   the method further comprises:
      as a result of a determination to not transfer the application to the second network, sending traffic associated with the application over the first network that the UE is registered to.

5. The method of claim 1, wherein the UE has a first subscription to the first network and a second subscription to the second network.

6. The method of claim 5, wherein at least one of:
   the transfer policy indicates a date and a time during which the transfer policy is valid;
   the transfer policy indicates a location at which the transfer policy is valid; and
   the location, the date and the time indicated in the transfer policy corresponding to an expected use of the application at a pre-determined event associated with the SNPN.

7. The method of claim 6, further comprising:
   when the transfer policy becomes invalid according to the location, the date and the time indicated in the transfer policy, discarding the transfer policy.

8. The method of claim 1, wherein the transfer policy indicates a network identifier, the network identifier identifying one of the first network and the second network to which the application is to be transferred to.

9. The method of claim 1, wherein the transfer policy indicates an application identifier, the application identifier identifying the application that is to be transferred according to the transfer policy.

10. The method of claim 1, wherein the transfer policy indicates a preferred access type, the preferred access type comprising a network identifier identifying one of the first network and the second network to which the application is to be transferred to.

11. The method of claim 10, wherein the transfer policy indicates a route selection descriptor, RSD, the RSD indicating the preferred access type and the network identifier.

12. The method of claim 10, wherein the transfer policy includes information indicating a traffic associated with the application.

13. The method of claim 8, wherein the information is comprised in a traffic descriptor, the traffic descriptor identifying the application that is to be transferred according to the transfer policy.

14. The method of claim 13, wherein the traffic descriptor further comprises a rule correlation identifier, ID;
   the method further comprising determining whether the rule correlation ID is a same for both the first network and the second network; and
   sending traffic to one of the first network and the second network based at least in part on whether the rule correlation ID is the same.

15. The method of claim 1, wherein the application is identified in the transfer policy as a Video, Imaging and Audio for Professional Application, VIAPA, application.

16. The method of claim 1, wherein the transfer policy is a UE route selection policy, URSP, and the policy node comprises a policy control function, PCF.

17. The method of claim 1, wherein the QoS sustainability prediction is based on local policies and analytics on QoS sustainability in a location of the plurality of UEs at an analytics target period in the future.

18. A method implemented in a network exposure, NE, node, the method comprising:
   receiving a transfer policy request, the transfer policy request being associated with an application and the transfer policy request being related to a network selection for the application;
   as a result of the received transfer policy request, sending the transfer policy request to a policy node associated with a first network; and
   receiving a transfer policy response identifying a transfer policy, the transfer policy indicating whether the application is to be transferred to using a second network, the second network being different from the first network associated with the policy node, the first network being one of a standalone non-public network, SNPN, and a public land mobile network, PLMN and the second network being another one of the SNPN and the PLMN and the transfer policy being based at least in part on Quality-of-service, QoS, information associated with the application, wherein the QoS information comprises a Quality-of-service, QoS, sustainability prediction for a plurality of user equipments, UEs, that are expected to use the application.

19. The method of claim 18, wherein the transfer policy request indicates at least one of a plurality of user equipments, UEs, that are expected to use the application, a time and a date that the plurality of UEs are expected to use the application and at least one Quality-of-service, QoS, requirement for the application.

20. The method of claim 18, wherein the QoS sustainability prediction is based on local policies and analytics on QoS sustainability in a location of the plurality of UEs at an analytics target period in the future.

\* \* \* \* \*